(12) United States Patent
Yoshida et al.

(10) Patent No.: US 11,791,497 B2
(45) Date of Patent: Oct. 17, 2023

(54) SOLID-STATE BATTERY AND METHOD FOR PRODUCING THE SAME

(71) Applicant: TOYOTA JIDOSHA KABUSHIKI KAISHA, Toyota (JP)

(72) Inventors: Jun Yoshida, Mishima (JP); Shinya Shiotani, Toyota (JP); Masaru Kubota, Toyota (JP); Yohei Shindo, Toyota (JP); Takeshi Usami, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 137 days.

(21) Appl. No.: 17/120,423

(22) Filed: Dec. 14, 2020

(65) Prior Publication Data
US 2021/0202987 A1    Jul. 1, 2021

(30) Foreign Application Priority Data
Dec. 26, 2019 (JP) ................. 2019-235590

(51) Int. Cl.
  H01M 10/0562    (2010.01)
  H01M 4/48        (2010.01)
  H01M 10/44       (2006.01)
  H01M 4/02        (2006.01)

(52) U.S. Cl.
  CPC ....... *H01M 10/0562* (2013.01); *H01M 4/483* (2013.01); *H01M 10/446* (2013.01); *H01M 2004/028* (2013.01); *H01M 2300/0068* (2013.01)

(58) Field of Classification Search
  None
  See application file for complete search history.

(56) References Cited

U.S. PATENT DOCUMENTS

| | | | |
|---|---|---|---|
| 2017/0200972 A1 | 7/2017 | Hasegawa et al. | |
| 2019/0081352 A1 | 3/2019 | Sasaki et al. | |
| 2019/0221843 A1 | 7/2019 | Kosaka et al. | |
| 2019/0372102 A1* | 12/2019 | Miki | H01M 4/525 |

FOREIGN PATENT DOCUMENTS

| | | |
|---|---|---|
| JP | 2017126552 A | 7/2017 |
| JP | 2019050182 A | 3/2019 |
| JP | 2019-125510 A | 7/2019 |

* cited by examiner

*Primary Examiner* — Sarah A. Slifka
(74) *Attorney, Agent, or Firm* — Dickinson Wright, PLLC (57) ABSTRACT

A solid-state battery having a low heat generation amount and low resistance, and a method for producing the same. The solid-state battery is a solid-state battery comprising: a cathode comprising a cathode layer that contains an oxide-based cathode active material, an anode comprising an anode layer that contains an anode active material, and a solid electrolyte layer being disposed between the cathode layer and the anode layer and containing a solid electrolyte, wherein at least any one of the cathode layer and the solid electrolyte layer contains a sulfide-based solid electrolyte, and wherein the sulfide-based solid electrolyte comprises a high oxygen concentration layer on a contact surface with the oxide-based cathode active material, the high oxygen concentration layer having a higher oxygen element concentration than other parts except the contact surface.

8 Claims, 4 Drawing Sheets

Oxide-based cathode active material      Sulfide-based solid electrolyte

FIG. 8

Oxide-based cathode active material      Sulfide-based solid electrolyte

SOLID-STATE BATTERY AND METHOD FOR PRODUCING THE SAME

TECHNICAL FIELD

The disclosure relates to a solid-state battery and method for producing the same.

BACKGROUND

In the field of solid-state batteries, there is an attempt to enhance the battery performance by focusing on the surface of a sulfide-based solid electrolyte.

For example, Patent Literature 1 describes that hydrogen sulfide generation is reduced by oxidizing the surface of a sulfide solid electrolyte material.

Patent Literature 2 describes that by exposing a sulfide-based solid electrolyte to an oxygen-containing gas atmosphere, a high oxygen concentration layer is formed on the surface of the sulfide-based solid electrolyte to increase the capacity-keeping rate of an all-solid battery.

Patent Literature 1: Japanese Patent Application Laid-Open (JP-A) No. 2019-050182
Patent Literature 2: JP-A No. 2017-126552

However, as disclosed in Patent Literatures 1 and 2, in the case of oxidizing the whole surface of a sulfide-based solid electrolyte, there is the following problem: the ion conductivity of the sulfide-based solid electrolyte is largely decreased, and a solid-state battery using the sulfide-based solid electrolyte has high resistance. Also, there is a problem in that the solid-state battery has a large heat generation amount.

SUMMARY

The disclosed embodiments were achieved in light of the above circumstances. An object of the disclosed embodiments is to provide a solid-state battery having a low heat generation amount and low resistance, and a method for producing the same.

In a first embodiment, there is provided a solid-state battery comprising:
a cathode comprising a cathode layer that contains an oxide-based cathode active material, an anode comprising an anode layer that contains an anode active material, and a solid electrolyte layer being disposed between the cathode layer and the anode layer and containing a solid electrolyte,
wherein at least any one of the cathode layer and the solid electrolyte layer contains a sulfide-based solid electrolyte, and
wherein the sulfide-based solid electrolyte comprises a high oxygen concentration layer on a contact surface with the oxide-based cathode active material, the high oxygen concentration layer having a higher oxygen element concentration than other parts except the contact surface.

In the solid-state battery of the disclosed embodiments, the thickness of the high oxygen concentration layer may be from 1 nm to 100 nm.

In another embodiment, there is provided a method for producing a solid-state battery, the method comprising:
battery forming of forming a solid-state battery comprising: a cathode comprising a cathode layer that contains an oxide-based cathode active material, an anode comprising an anode layer that contains an anode active material, and a solid electrolyte layer being disposed between the cathode layer and the anode layer and containing a solid electrolyte,
charging the solid-state battery in an oxygen-free atmosphere until a potential of the cathode exceeds a maximum cathode potential in normal use, and
storing the solid-state battery in an oxygen-free atmosphere after the charging,
wherein at least any one of the cathode layer and the solid electrolyte layer contains a sulfide-based solid electrolyte.

In the method for producing the solid-state battery according to the disclosed embodiments, the storing temperature of the solid-state battery in the storing may be from 60° C. to 80° C.

According to the disclosed embodiments, the solid-state battery having a low heat generation amount and low resistance, and the method for producing the same can be provided.

BRIEF DESCRIPTION OF THE DRAWINGS

In the accompanying drawings.

DETAILED DESCRIPTION

A. Solid-State Battery

The solid-state battery of the disclosed embodiments is a solid-state battery comprising:
a cathode comprising a cathode layer that contains an oxide-based cathode active material, an anode comprising an anode layer that contains an anode active material, and a solid electrolyte layer being disposed between the cathode layer and the anode layer and containing a solid electrolyte,
wherein at least any one of the cathode layer and the solid electrolyte layer contains a sulfide-based solid electrolyte, and
wherein the sulfide-based solid electrolyte comprises a high oxygen concentration layer on a contact surface with the oxide-based cathode active material, the high oxygen concentration layer having a higher oxygen element concentration than other parts except the contact surface.

In the disclosed embodiments, "when the solid-state battery is fully charged" means that the SOC (state of charge) value of the solid-state battery in normal use is 100%. The SOC means the percentage of the charge capacity with respect to the full charge capacity of the battery. The full charge capacity is a SOC of 100%.

For example, the SOC may be estimated from the open circuit voltage (OCV) of the solid-state battery.

Figure 1:
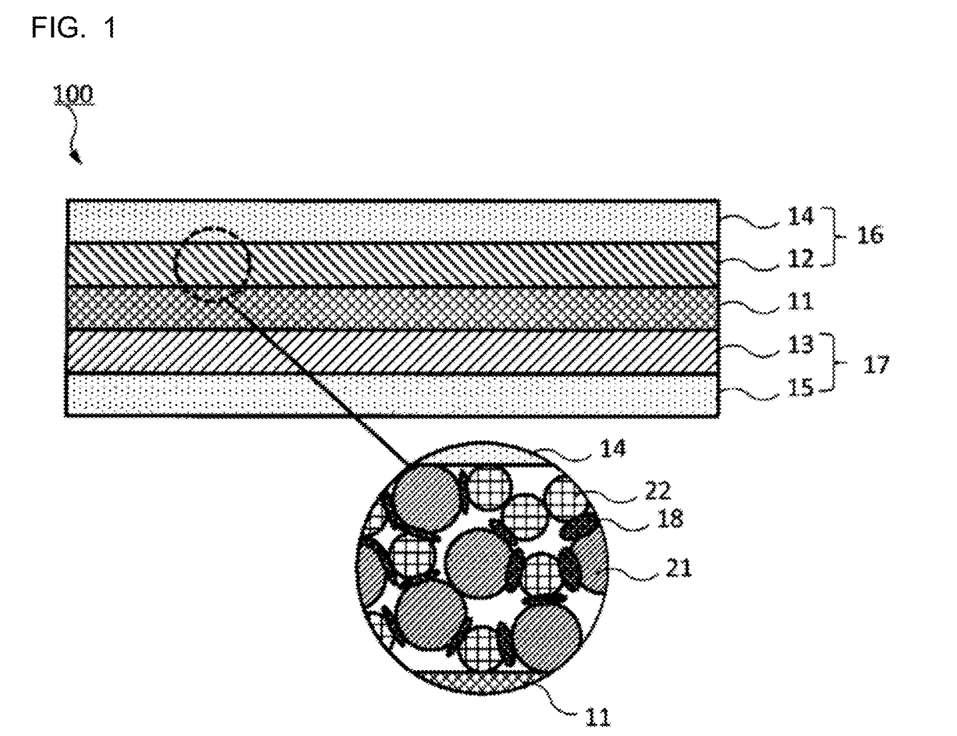
FIG. 1 is a schematic sectional view of an example of the solid-state battery of the disclosed embodiments.

FIG. 1 is a schematic sectional view of an example of the solid-state battery of the disclosed embodiments.

A solid-state battery 100 comprises a cathode 16, an anode 17 and a solid electrolyte layer 11. The cathode 16 comprises a cathode layer 12 and a cathode current collector 14. The anode 17 comprises an anode layer 13 and an anode current collector 15. The solid electrolyte layer 11 is disposed between the cathode 16 and the anode 17. Also, the cathode layer 12 comprises particles of an oxide-based cathode active material 21, particles of a sulfide-based solid electrolyte 22, and a high oxygen concentration layer 18 on a contact surface between the particles of the oxide-based cathode active material 21 and the particles of the sulfide-based solid electrolyte 22.

Figure 2:
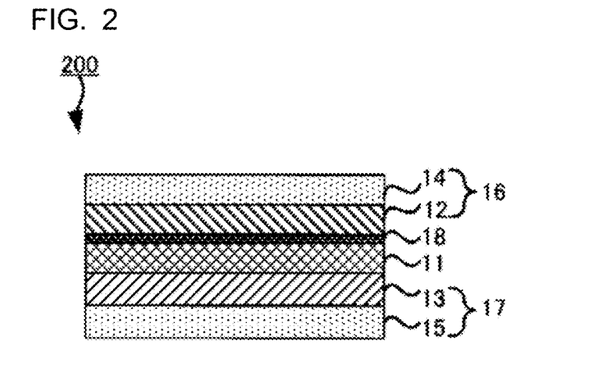
FIG. 2 is a schematic sectional view of another example of the solid-state battery of the disclosed embodiments.

FIG. 2 is a schematic sectional view of an example of the solid-state battery of the disclosed embodiments.

A solid-state battery 200 comprises the cathode 16, the anode 17 and the solid electrolyte layer 11. The cathode 16 comprises the cathode layer 12 and the cathode current collector 14. The anode 17 comprises the anode layer 13 and the anode current collector 15. The solid electrolyte layer 11 is disposed between the cathode 16 and the anode 17. Also, the solid electrolyte layer 11 comprises the high oxygen concentration layer 18 on a contact surface with the cathode layer 12.

[Cathode]

The cathode comprises at least the cathode layer. As needed, it comprises the cathode current collector for collecting current from the cathode layer.

The cathode layer contains at least the oxide-based cathode active material as the cathode active material. As needed, it contains an electroconductive material, a binder, a solid electrolyte, etc.

At least any one of the cathode layer and the below-described solid electrolyte layer contains the sulfide-based solid electrolyte.

The oxide-based cathode active material is not particularly limited, as long as it is a material which contains an oxygen element and which functions as an active material at a predetermined cathode potential. As the oxide-based cathode active material, examples include, but are not limited to, $Li_4Ti_5O_{12}$, $LiCoO_2$, $LiNi_xCo_{1-x}O_2$ (where $0<x<1$), $LiNi_{1/3}Co_{1/3}Mn_{1/3}O_2$, $LiMnO_2$, $LiMn_{1.5}Ni_{0.5}O_4$, $LiMn_{1.5}Al_{0.5}O_4$, $LiMn_{1.5}Mg_{0.5}O_4$, $LiMn_{1.5}Co_{0.5}O_4$, $LiMn_{1.5}Fe_{0.5}O_4$, $LiMn_{1.5}Zn_{0.5}O_4$, $Li_2TiO_3$, $LiFePO_4$, $LiMnPO_4$, $LiCoPO_4$, $LiNiPO_4$, $Li_2SiO_3$, $Li_4SiO_4$, $V_2O_5$, $MoO_3$ and $SiO_2$.

As long as the cathode layer contains, as a main component, the oxide-based cathode active material as the cathode active material, the cathode layer may also contain a conventionally-known, non-oxide-based cathode active material.

As the non-oxide-based cathode active material, examples include, but are not limited to, lithium metal (Li), lithium alloy, Si, Si alloy, LiCoN, $TiS_2$, $Mg_2Sn$, $Mg_2Ge$, $Mg_2Sb$ and $Cu_3Sb$.

As the lithium alloy, examples include, but are not limited to, Li—Au, Li—Mg, Li—Sn, Li—Si, Li—Al, Li—B, Li—C, Li—Ca, Li—Ga, Li—Ge, Li—As, Li—Se, Li—Ru, Li—Rh, Li—Pd, Li—Ag, Li—Cd, Li—In, Li—Sb, Li—Ir, Li—Pt, Li—Hg, Li—Pb, Li—Bi, Li—Zn, Li—Tl, Li—Te and Li—At. As the Si alloy, examples include, but are not limited to, alloys with metals such as Li. Also, the Si alloy may be an alloy with at least one kind of metal selected from the group consisting of Sn, Ge and Al.

A coating layer containing a Li ion conducting oxide, may be formed on the surface of the cathode active material. That is, the cathode active material may be such a composite cathode active material, that a coating layer containing a Li ion conducting oxide is formed on the surface of the cathode active material. This is because a reaction between the cathode active material and the solid electrolyte can be suppressed.

As the Li ion conducting oxide, examples include, but are not limited to, $LiNbO_3$, $Li_4Ti_5O_{12}$ and $Li_3PO_4$. The thickness of the coating layer is 0.1 nm or more, for example, and it may be 1 nm or more. On the other hand, the thickness of the coating layer is 100 nm or less, for example, and it may be 20 nm or less. Also, for example, 70% or more or 90% or more of the cathode active material surface may be coated with the coating layer.

The method for coating the surface of the cathode active material with the Li ion conducting oxide is not particularly limited. As the method, examples include, but are not limited to, a method of coating the cathode active material with the Li ion conducting oxide in the air environment by use of a tumbling/fluidizing coater (manufactured by Powrex Corporation) and firing the cathode active material coated with the Li ion conducting oxide in the air environment. The examples also include, but are not limited to, a sputtering method, a sol-gel method, an electrostatic spraying method and a ball milling method.

The form of the cathode active material is not particularly limited. As the form, examples include, but are not limited to, a particulate form and a plate form.

The content of the cathode active material in the cathode layer is not particularly limited. When the total mass of the cathode layer is determined as 100 mass %, the content of the cathode active material may be from 50 mass % to 90 mass %, for example.

As the solid electrolyte, examples include, but are not limited to, a solid electrolyte that may be contained in the solid electrolyte layer described below.

The content of the solid electrolyte in the cathode layer is not particularly limited. When the total mass of the cathode layer is determined as 100 mass %, the content of the solid electrolyte may be from 1 mass % to 80 mass %, for example.

The binder is not particularly limited. As the binder, examples include, but are not limited to, acrylonitrile butadiene rubber (ABR), butadiene rubber (BR), polyvinylidene fluoride (PVdF) and styrene-butadiene rubber (SBR). The content of the binder in the cathode layer is not particularly limited.

As the electroconductive material, a known electroconductive material may be used. As the electroconductive material, examples include, but are not limited to, a carbonaceous material and a metal material. The carbonaceous material may be at least one selected from the group consisting of vapor-grown carbon fiber (VGCF), carbon nanotube, carbon nanofiber and carbon black such as acetylene black and furnace black. Of them, the electroconductive material may be at least one selected from the group consisting of VGCF, carbon nanotube and carbon nanofiber, from the viewpoint of electron conductivity. As the metal material, examples include, but are not limited to, Ni, Cu, Fe and SUS.

The content of the electroconductive material in the cathode layer is not particularly limited.

The thickness of the cathode layer is not particularly limited. For example, it may be from 10 μm to 250 μm.

The cathode layer may be formed by the following method, for example. A cathode layer slurry is produced by putting the oxide-based cathode active material and, as needed, other components in a solvent and mixing them. The cathode layer slurry is applied on one surface of a support such as the cathode current collector. The applied slurry is dried, thereby obtaining the cathode layer.

As the solvent, examples include, but are not limited to, butyl acetate, butyl butyrate, heptane and N-methyl-2-pyrrolidone.

The method for applying the cathode layer slurry on one surface of the support such as the cathode current collector, is not particularly limited. As the method, examples include, but are not limited to, a doctor blade method, a metal mask printing method, an electrostatic coating method, a dip coating method, a spray coating method, a roller coating method, a gravure coating method and a screen printing method.

The support may be appropriately selected from self-supporting supports, and it is not particularly limited. For example, a metal foil such as Cu and Al may be used as the support.

The cathode layer may be formed by another method such as pressure-forming a powdered cathode mixture that contains the oxide-based cathode active material and, as needed, other components. In the case of pressure-forming the powdered cathode mixture, generally, a press pressure of about 1 MPa or more and about 600 MPa or less is applied.

The pressure applying method is not particularly limited. As the method, examples include, but are not limited to, pressing by use of a plate press machine, a roll press machine or the like.

The cathode current collector functions to collect current from the cathode layer. As the material for the cathode current collector, examples include, but are not limited to, a metal material such as SUS, Ni, Cr, Au, Pt, Al, Fe, Ti and Zn.

As the form of the cathode current collector, examples include, but are not limited to, a foil form, a plate form and a mesh form.

The cathode may further comprise a cathode lead connected to the cathode current collector.

[Anode]

The anode comprises at least the anode layer. As needed, it may comprise an anode current collector for collecting current from the anode layer.

The anode layer contains at least the anode active material. As needed, it may contain an electroconductive material, a binder, a solid electrolyte, etc.

As the anode active material, examples include, but are not limited to, graphite, hard carbon, elemental lithium, lithium alloy, elemental Si, Si alloy and $Li_4Ti_5O_{12}$. As the lithium alloy and the Si alloy, those exemplified above for the cathode active material may be used.

The form of the anode active material is not particularly limited. As the form, examples include, but are not limited to, a particulate form and a plate form.

As the electroconductive material and binder used in the anode layer, those exemplified above for the cathode layer may be used. As the solid electrolyte used in the anode layer, the solid electrolyte used in the below-described solid electrolyte layer may be used.

The thickness of the anode layer is not particularly limited. For example, it may be from 10 μm to 100 μm.

The content of the anode active material in the anode layer is not particularly limited. For example, it may be from 20 mass % to 90 mass %.

As the material for the anode current collector, examples include, but are not limited to, a metal material such as SUS, Cu, Ni, Fe, Ti, Co and Zn. As the form of the anode current collector, the same form as the form of the above-described cathode current collector, may be used.

[Solid Electrolyte Layer]

The solid electrolyte layer contains at least the solid electrolyte. As needed, it may contain a binder, etc.

At least any one of the above-described cathode layer and solid electrolyte layer contains the sulfide-based solid electrolyte.

As the solid electrolyte, examples include, but are not limited to, a sulfide-based solid electrolyte and an oxide-based solid electrolyte.

The sulfide-based solid electrolyte may comprise a Li element, an A element (A is at least one of P, Ge, Si, Sn, B and Al) and an S element. The sulfide-based solid electrolyte may further comprise a halogen element. As the halogen element, examples include, but are not limited to, an F element, a Cl element, a Br element and an I element. Also, the sulfide-based solid electrolyte may further comprise an O element.

As the sulfide-based solid electrolyte, examples include, but are not limited to, $Li_2S$—$P_2S_5$, $Li_2S$—$P_2S_5$—LiI, $Li_2S$—$P_2S_5$—$GeS_2$, $Li_2S$—$P_2S_5$—$Li_2O$, $Li_2S$—$P_2S_5$—$Li_2O$—LiI, $Li_2S$—$P_2S_5$—LiI—LiBr, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (where m and n are positive numbers, and Z is Ge, Zn or Ga), $Li_2S$—$GeS_2$, $Li_2S$—$SiS_2$—$Li_3PO_4$ and $Li_2S$—$SiS_2$—$Li_xMO_y$ (where x and y are positive numbers, and M is P, Si, Ge, B, Al, Ga or In). The "$Li_2S$—$P_2S_5$" means a material composed of a raw material composition containing $Li_2S$ and $P_2S_5$, and the same applies to other solid electrolytes.

The molar ratio of the elements in the sulfide-based solid electrolyte can be controlled by controlling the contents of the elements contained in raw materials. The molar ratio and composition of the elements in the sulfide-based solid electrolyte can be measured by inductively coupled plasma atomic emission spectroscopy, for example.

The sulfide-based solid electrolyte may be sulfide glass, crystallized sulfide glass (glass ceramics) or a crystalline material obtained by developing a solid state reaction of the raw material composition.

The crystal state of the sulfide-based solid electrolyte can be confirmed by X-ray powder diffraction measurement using CuKα radiation, for example.

The sulfide glass can be obtained by amorphizing a raw material composition (such as a mixture of $Li_2S$ and $P_2S_5$). The raw material composition can be amorphized by mechanical milling, for example.

The glass ceramics can be obtained by heating the sulfide glass, for example.

For the heating, the heating temperature may be a temperature higher than the crystallization temperature (Tc) of the sulfide glass, which is a temperature observed by thermal analysis measurement. In general, it is 195° C. or more. On the other hand, the upper limit of the heating temperature is not particularly limited.

The crystallization temperature (Tc) of the sulfide glass can be measured by differential thermal analysis (DTA).

The heating time is not particularly limited, as long as the desired crystallinity of the glass ceramics is obtained. For example, it is in a range of from one minute to 24 hours, or it may be in a range of from one minute to 10 hours.

The heating method is not particularly limited. For example, a firing furnace may be used.

As the oxide-based solid electrolyte, examples include, but are not limited to, $Li_{6.25}La_3Zr_2Al_{0.25}O_{12}$, $Li_3PO_4$, and $Li_{3+x}PO_{4-x}N_x$ (where $1 \leq x \leq 3$).

The form of the solid electrolyte is not particularly limited. As the form, examples include, but are not limited to, a particulate form and a plate form. From the viewpoint of handling, the form of the solid electrolyte may be a particulate form.

The average particle diameter (D50) of the solid electrolyte particles is not particularly limited. The lower limit may be 0.5 µm or more, and the upper limit may be 2 µm or less.

In the disclosed embodiments, unless otherwise noted, the average particle diameter of particles is a volume-based median diameter (D50) measured by laser diffraction/scattering particle size distribution measurement. Also in the disclosed embodiments, the median diameter (D50) of particles is a diameter at which, when particles are arranged in ascending order of their particle diameter, the accumulated volume of the particles is half (50%) the total volume of the particles (volume average diameter).

As the solid electrolyte, one or more kinds of solid electrolytes may be used. In the case of using two or more kinds of solid electrolytes, they may be mixed together, or they may be formed into layers to obtain a multi-layered structure.

The proportion of the solid electrolyte in the solid electrolyte layer is not particularly limited. For example, it may be 50 mass % or more, may be in a range of 60 mass % or more and 100 mass % or less, may be in a range of 70 mass % or more and 100 mass % or less, or may be 100 mass %.

As the binder used in the solid electrolyte layer, examples include, but are not limited to, materials exemplified above for the cathode layer. The content of the binder in the solid electrolyte layer may be 5 mass % or less, from the viewpoint of, for example, preventing excessive aggregation of the solid electrolyte and making it possible to form the solid electrolyte layer in which the solid electrolyte is uniformly dispersed, for the purpose of easily achieving high power output.

[High Oxygen Concentration Layer]

The high oxygen concentration layer is a layer which is formed on a contact surface of the sulfide-based solid electrolyte with the oxide-based cathode active material and which has a higher oxygen element concentration than other parts except the contact surface. Accordingly, the sulfide-based solid electrolyte comprises the high oxygen concentration layer on the contact surface with the oxide-based cathode active material, the high oxygen concentration layer having a higher oxygen element concentration than other parts except the contact surface.

When the oxide-based cathode active material is such a composite cathode active material, that a coating layer is formed on the surface of the oxide-based cathode active material, the high oxygen concentration layer may be formed on the contact surface of the sulfide-based solid electrolyte with the composite cathode active material.

The high oxygen concentration layer may be formed on the contact surface of the sulfide-based solid electrolyte in the cathode layer with the oxide-based cathode active material in the cathode layer, or the high oxygen concentration layer may be formed on the contact surface of the solid electrolyte layer containing the sulfide-based solid electrolyte with the cathode layer containing the oxide-based cathode active material.

The high oxygen concentration layer may be formed by the following method, for example. The solid-state battery is charged in an oxygen-free atmosphere until the potential of the cathode exceeds the maximum cathode potential in normal use, and then the solid-state battery is stored for the predetermined time, at the predetermined temperature and in the oxygen-free atmosphere, thereby forming the high oxygen concentration layer.

Also, the high oxygen concentration layer may be formed only on the contact surface of the sulfide-based solid electrolyte with the oxide-based cathode active material. This is because the ion conductivity of the sulfide-based solid electrolyte may decrease when the high oxygen concentration layer is formed on many parts in addition to the contact surface with the oxide-based cathode active material.

The thickness of the high oxygen concentration layer is not particularly limited. For example, it may be 1 nm or more, 10 nm or more, or 25 nm or more, and it may be 100 nm or less, or 50 nm or less. When the high oxygen concentration layer is too thick, the ion conductivity of the sulfide-based solid electrolyte is too low. When the high oxygen concentration layer is too thin, the solid-state battery is less effective in suppressing heat generation. The thickness of the high oxygen concentration layer may be measured by observation with a scanning electron microscope (SEM) or a transmission electron microscope (TEM), for example.

The formation state of the high oxygen concentration layer may be confirmed by X-ray diffraction (XRD) measurement, TEM-EDX (transmission electron microscope-energy dispersive X-ray spectroscope) analysis, STEM-EDX (scanning transmission electron microscope-energy dispersive X-ray spectroscope) analysis, RBS (Rutherford backscattering spectrometry), PIXE (particle induced X-ray emission) analysis, HFS (hydrogen forward scattering) analysis or NRA (nuclear reaction analysis), for example.

[Other Components]

As needed, the solid-state battery comprises an outer casing for housing the cathode, the anode and the solid electrolyte layer.

The material for the outer casing is not particularly limited, as long as it is a material that is stable in electrolytes. As the material, examples include, but are not limited to, resins such as polypropylene, polyethylene and acrylic resins.

[Solid-State Battery]

As the solid-state battery, examples include, but are not limited to, a lithium battery, a sodium battery, a magnesium battery and a calcium battery. Of them, the solid-state battery may be a lithium battery, from the viewpoint of high battery power output.

As the form of the solid-state battery, examples include, but are not limited to, a coin form, a laminate form, a cylindrical form and a square form.

B. Solid-State Battery Production Method

The solid-state battery production method of the disclosed embodiments is a method for producing a solid-state battery, the method comprising:

battery forming of forming a solid-state battery comprising: a cathode comprising a cathode layer that contains an oxide-based cathode active material, an anode comprising an anode layer that contains an anode active material, and a solid electrolyte layer being disposed between the cathode layer and the anode layer and containing a solid electrolyte, charging the solid-state battery in an oxygen-free atmosphere until a potential of the cathode exceeds a maximum cathode potential in normal use, and storing the solid-state battery in an oxygen-free atmosphere after the charging, wherein at least any one of the cathode layer and the solid electrolyte layer contains a sulfide-based solid electrolyte.

The solid-state battery production method of the disclosed embodiments comprises at least the steps of (1) battery forming, (2) charging and (3) storing.

(1) Battery Forming

This is a step of forming a solid-state battery comprising: a cathode comprising a cathode layer that contains an oxide-based cathode active material, an anode comprising an anode layer that contains an anode active material, and a solid electrolyte layer being disposed between the cathode layer and the anode layer and containing a solid electrolyte.

The solid-state battery formed in the battery forming step is a battery in a chargeable/dischargeable state.

Figure 3:
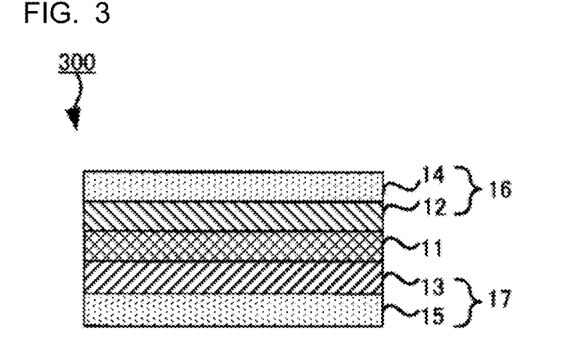
FIG. 3 is a schematic sectional view of an example of the solid-state battery formed in the battery forming step.

FIG. 3 is a schematic sectional view of an example of the solid-state battery formed in the battery forming step of the disclosed embodiments.

A solid-state battery 300 comprises a cathode 16, an anode 17, and a solid electrolyte layer 11. The cathode 16 comprises a cathode layer 12 and a cathode current collector 14. The anode 17 comprises an anode layer 13 and an anode current collector 15. The solid electrolyte layer 11 is disposed between the cathode 16 and the anode 17.

The cathode comprises at least the cathode layer. As needed, it further comprises the cathode current collector.

The cathode layer contains at least the oxide-based cathode active material. As needed, it contains a non-oxide-based cathode active material, an electroconductive material, a binder and a solid electrolyte. The cathode active material such as the oxide-based cathode active material and the non-oxide-based cathode active material may be such a composite cathode active material, that a coating layer containing a Li ion conducting oxide is formed on the surface of the cathode active material.

As the cathode current collector, the oxide-based cathode active material, the non-oxide-based cathode active material, the Li ion conducting oxide, the electroconductive material, the binder and the solid electrolyte, examples include, but are not limited to, materials exemplified above in "A. Solid-state battery".

The anode comprises at least the anode layer. As needed, it comprises an anode current collector for collecting current from the anode layer.

The anode layer contains at least the anode active material. As needed, it contains an electroconductive material, a binder and a solid electrolyte.

As the anode current collector, the anode active material, the electroconductive material, the binder and the solid electrolyte, examples include, but are not limited to, materials exemplified above in "A. Solid-state battery".

The solid electrolyte layer contains at least the solid electrolyte. As needed, it may contain a binder, etc.

As the solid electrolyte and the binder, examples include, but are not limited to, materials exemplified above in "A. Solid-state battery".

As needed, the solid-state battery comprises an outer casing for housing the cathode, the anode and the solid electrolyte layer.

As the material for the outer casing, examples include, but are not limited to, materials exemplified above in "A. Solid-state battery".

The solid-state battery may be produced by the following method, for example. First, the solid electrolyte layer is formed by pressure-forming a powdered solid electrolyte material. Next, the cathode layer is obtained by pressure-forming a powdered cathode mixture that contains the oxide-based cathode active material on one surface of the solid electrolyte layer. Then, the anode layer is obtained by pressure-forming a powdered anode mixture on the opposite surface of the solid electrolyte layer to the surface on which the cathode layer is formed. As needed, a cathode current collector and an anode current collector are attached thereto, thereby obtaining the solid-state battery.

In this case, the press pressure applied for pressure-forming the powdered solid electrolyte material, the powdered cathode mixture and the powdered anode mixture, is generally about 1 MPa or more and about 600 MPa or less.

The pressing method is not particularly limited. As the pressing method, examples include, but are not limited to, those exemplified above in the formation of the cathode layer.

(2) Charging

This is a step of charging the solid-state battery in an oxygen-free atmosphere until the potential of the cathode exceeds the maximum cathode potential in normal use.

By charging the solid-state battery until the potential of the cathode exceeds the maximum cathode potential in normal use, the high oxygen concentration layer can be formed on the contact surface of the sulfide-based solid electrolyte with the oxide-based cathode active material, the high oxygen concentration layer having a higher oxygen element concentration than other parts except the contact surface.

The maximum cathode potential in normal use may be appropriately determined depending on the intended application of the battery, the type of the oxide-based cathode active material, etc. For example, when the oxide-based cathode active material is $LiNi_{1/3}Co_{1/3}Mn_{1/3}O_2$ or the like, the maximum cathode potential may be less than 4.6 V (vs. $Li/Li^+$).

The charging condition is not particularly limited. As the condition, examples include, but are not limited to, charging at constant current-constant voltage. The current value is not particularly limited. For example, it may be from 0.1 mAh to 10 mAh. This is because the battery takes a long time to charge when the current value is too small, and a large overvoltage occurs when the current value is too large.

The oxygen-free atmosphere may be an atmosphere that does not contain an oxygen element. For example, the oxygen-free atmosphere may be an inert gas atmosphere such as argon gas and nitrogen gas, a vacuum atmosphere, etc.

(3) Storing

This is a step of storing the solid-state battery in an oxygen-free atmosphere after the charging.

The storing time is not particularly limited and may be from one hour to 4 hours.

The storing temperature is not particularly limited and may be from 40° C. to 80° C. From the viewpoint of accelerating the desorption of the oxygen element from the oxide-based cathode active material and accelerating a reaction between the desorbed oxygen element and the sulfide-based solid electrolyte, the storing temperature may be from 60° C. to 80° C.

As the oxygen-free atmosphere, examples include, but are not limited to, those exemplified above in "(2) Charging".

As the solid-state battery obtained by the production method of the disclosed embodiments, examples include, but are not limited to, a lithium battery, a sodium battery, a magnesium battery and a calcium battery. Of them, the solid-state battery may be a lithium battery, from the viewpoint of high battery power output.

EXAMPLES

Example 1

[Battery Forming]
[Production of Cathode Mixture]

In the air environment, the surface of $LiNi_{1/3}Co_{1/3}Mn_{1/3}O_2$ particles was coated with $LiNbO_3$ by use of a tumbling/fluidizing coater (manufactured by Powrex Corporation). The coated particles were fired in the air environment to coat the surface of the $LiNi_{1/3}Co_{1/3}Mn_{1/3}O_2$ particles with the $LiNbO_3$ (thickness 10 nm), thereby obtaining a cathode active material composite.

In an argon gas atmosphere, the cathode active material composite and sulfide-based solid electrolyte ($Li_2S$—$P_2S_5$-based glass ceramics) particles were weighed in a volume ratio of 50:50 and mixed to obtain a cathode mixture (20 mg).

[Production of Anode Mixture]

Natural graphite-based carbon particles (manufactured by Nippon Carbon Co., Ltd.) were used as an anode active material, and $Li_2S$—$P_2S_5$-based glass ceramic particles were used as a sulfide-based solid electrolyte. In an argon gas atmosphere, they were weighed in a volume ratio of 50:50 and mixed to obtain an anode mixture (20 mg).

[Production of Solid Electrolyte Layer]

As a sulfide-based solid electrolyte, 50 mg of $Li_2S$—$P_2S_5$-based glass ceramics powder (particles) was prepared. In an argon gas atmosphere, the powder was pressed by a pressing machine to obtain a solid electrolyte layer.

[Production of Solid-State Battery]

In an argon gas environment, the cathode mixture, the solid electrolyte layer and the anode mixture were arranged in this order and pressed at a pressure of 6 ton/cm² (≈588 MPa), thereby obtaining a solid-state battery comprising a cathode layer, the solid electrolyte layer and an anode layer in this order.

[Charging]

The thus-obtained solid-state battery was put in a glass container filled with argon gas. In an environment at 25° C., the battery was charged with constant current-constant voltage (CCCV) until the cathode potential reached 4.6 V vs. $Li/Li^+$, which is a potential higher than the maximum cathode potential in normal use.

[Storing]

Then, in a glass container filled with argon gas, the solid-state battery was left in an environment at 60° C. and stored for one hour.

Comparative Example 1

A solid-state battery was produced in the same manner as Example 1, except that the charging and storing steps were not carried out.

Comparative Example 2

A solid-state battery was produced in the same manner as Example 1, except that the atmosphere of the glass container in the charging step was changed to the air atmosphere, and the storing step was not carried out.

[Battery Evaluation]

In an environment at 25° C., the solid-state battery obtained in Example 1 was discharged at 0.1 C until the voltage reached 3.5 V, and then charged at 0.1 C until the voltage reached 4.2 V. Then, the SOC of the solid-state battery was controlled to 60%, and the battery resistance was obtained from a voltage decrease amount 10 seconds after discharging at 2 mA.

Differential scanning calorimetry (DSC) of the charged and discharged solid-state battery was carried out, and the heat generation amount of the solid-state battery was measured.

Battery evaluation of the solid-state batteries obtained in Comparative Examples 1 and 2 was carried out in the same manner as the solid-state battery of Example 1, and the battery resistance and heat generation amount of the batteries were obtained. The results are shown in Table 1.

TABLE 1

| | Battery properties | |
|---|---|---|
| | Heat generation amount (W · s/g) | Battery resistance (Ω) |
| Example 1 | 776 | 1.3 |
| Comparative Example 1 | 1735 | 1.1 |
| Comparative Example 2 | 1664 | 3.2 |

As shown in Table 1, the solid-state battery of Example 1 in which the charging and storing steps were carried out, was confirmed to exhibit almost the same battery resistance value as the solid-state battery of Comparative Example 1 in which the charging and storing steps were not carried out. Also, the heat generation amount of the solid-state battery of Example 1 was confirmed to be remarkably lower than the solid-state battery of Comparative Example 1.

For the solid-state battery of Comparative Example 2 in which the sulfide-based solid electrolyte exposed to the air was used, it was confirmed that the battery resistance is remarkably larger than the solid-state battery of Example 1, and the heat generation amount still remains large while it is smaller than the solid-state battery of Comparative Example 1.

Accordingly, it is estimated that by charging the solid-state battery until the potential of the cathode exceeds the maximum cathode potential in normal use, the sulfide-based solid electrolyte in contact with the oxide-based cathode active material reacts with oxygen gas, and the high oxygen concentration layer having a higher oxygen element concentration than other parts except the contact surface, is selectively and efficiently formed on the contact surface of the sulfide-based solid electrolyte with the oxide-based cathode active material.

[TEM Observation of Contact Surface]

After the above-described storing step was completed, TEM-EDX analysis of the contact surface between the oxide-based cathode active material particles and sulfide-based solid electrolyte particles in the cathode layer of Example 1, was carried out.

Figure 4:
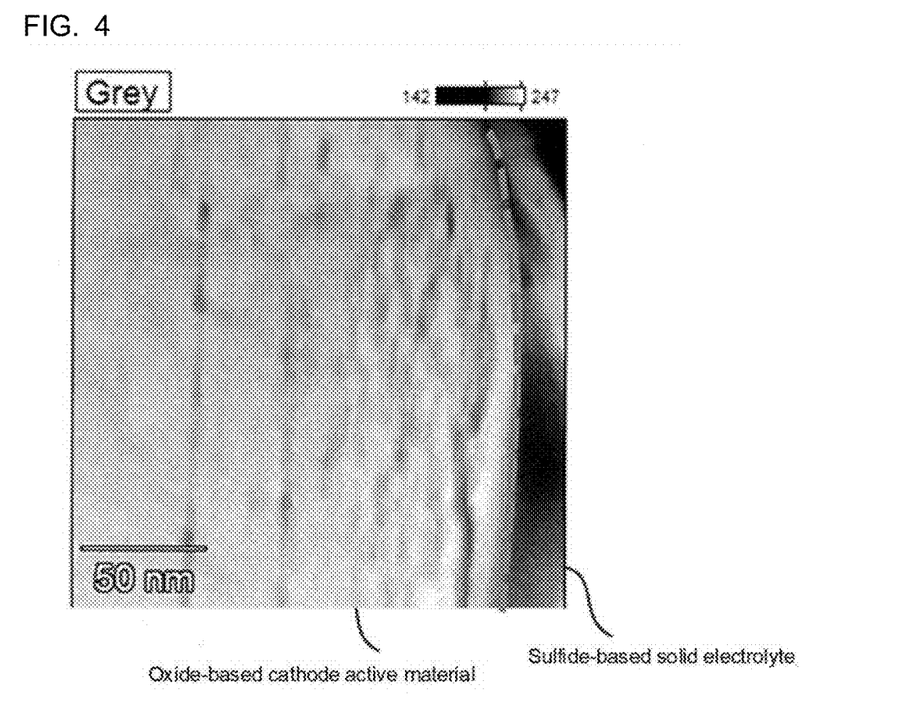
FIG. 4 is a TEM image of a cathode layer obtained in Example 1.
Figure 5:
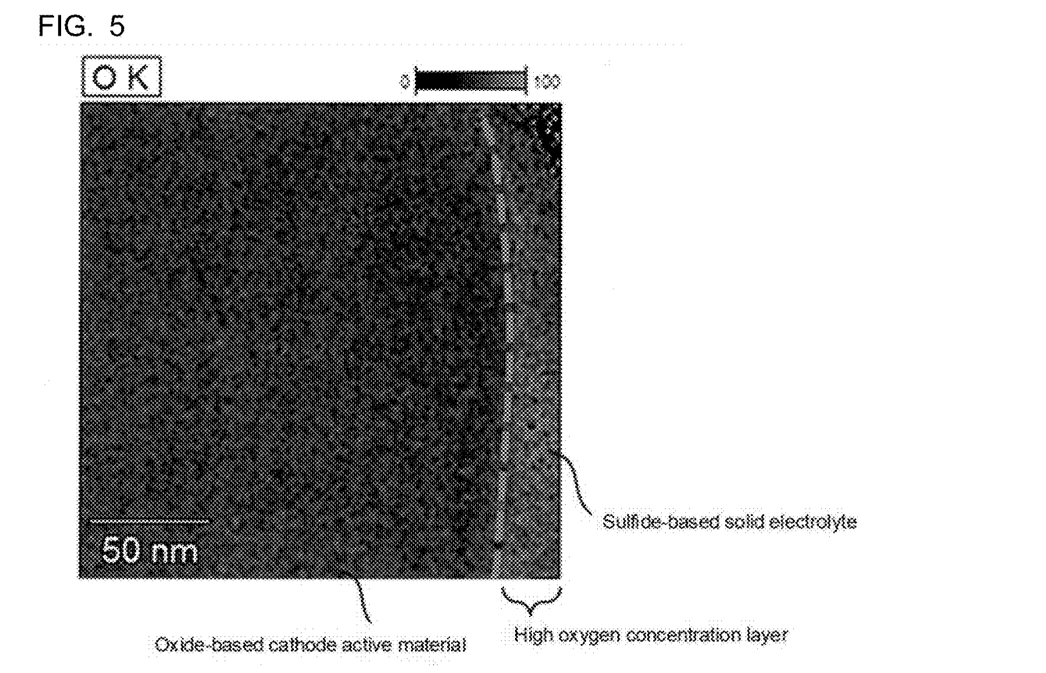
FIG. 5 is a TEM-EDX image showing the distribution of an oxygen element in the cathode layer obtained in Example 1.
Figure 6:
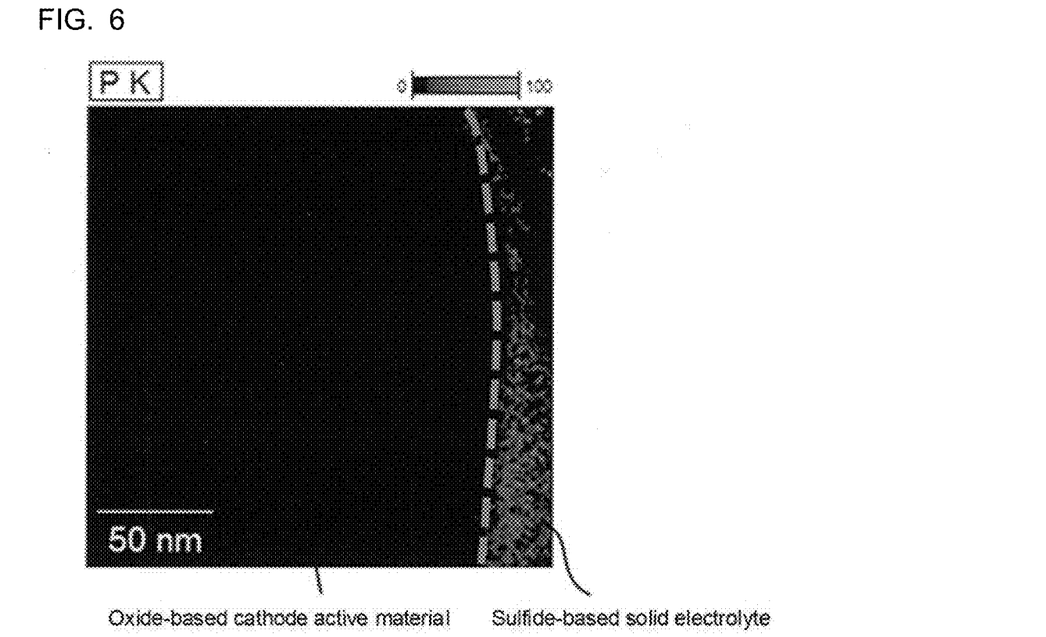
FIG. 6 is a TEM-EDX image showing the distribution of a phosphorus element in the cathode layer obtained in Example 1.
Figure 7:
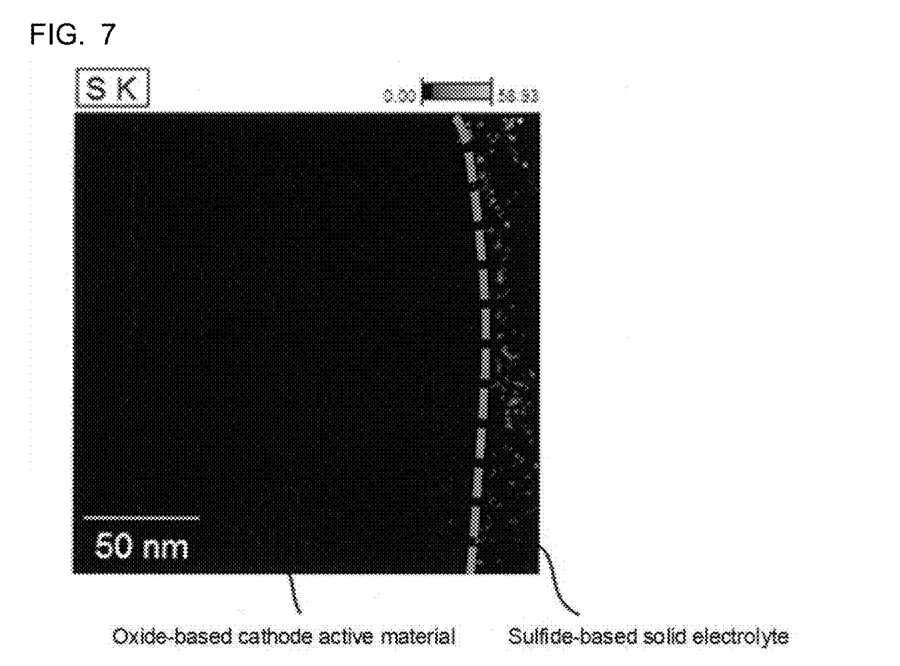
FIG. 7 is a TEM-EDX image showing the distribution of a sulfur element in the cathode layer obtained in Example 1.
Figure 8:
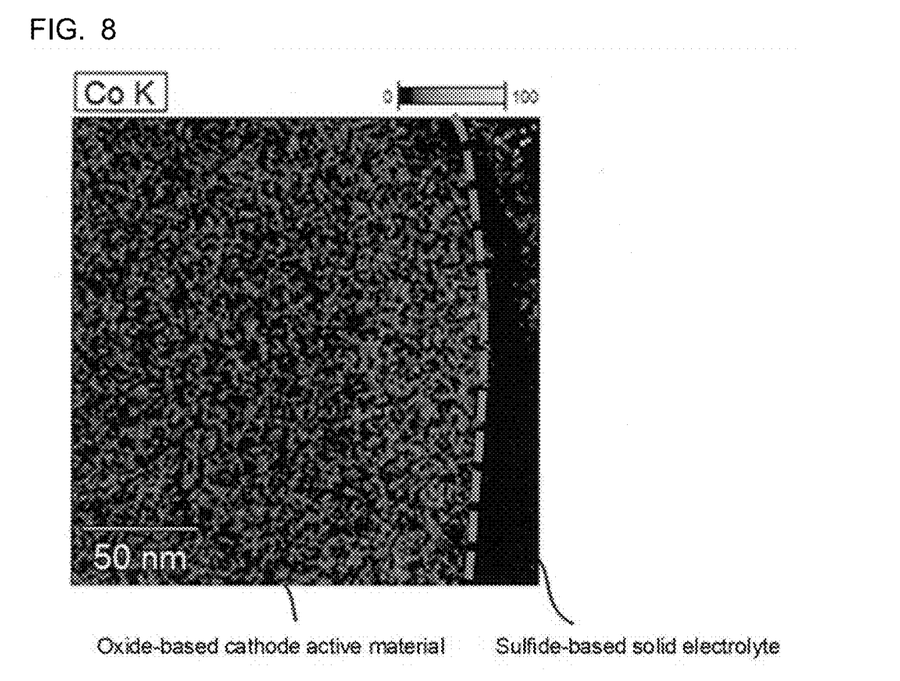
FIG. 8 is a TEM-EDX image showing the distribution of a cobalt element in the cathode layer obtained in Example 1.

FIG. 4 shows a TEM (transmission electron microscope) image of the cathode layer. FIG. 5 shows a TEM-EDX image showing the distribution of the oxygen element in the cathode layer. FIG. 6 shows a TEM-EDX image showing the distribution of the phosphorus element in the cathode layer. FIG. 7 shows a TEM-EDX image showing the distribution of the sulfur element in the cathode layer. FIG. 8 shows a TEM-EDX image showing the distribution of the cobalt element in the cathode layer. Dashed lines shown in FIGS. 4 to 8 indicate the contact surface between the oxide-based cathode active material particles and the sulfide-based solid electrolyte particles. As shown in FIG. 5, it is clear that the oxygen element is distributed in the sulfide-based solid electrolyte area. Since the oxygen element is not contained in the composition of the sulfide-based solid electrolyte, it can be decided that the high oxygen concentration layer is formed on the contact surface of the sulfide-based solid electrolyte particles with the oxide-based cathode active material particles, the high oxygen concentration layer having a thickness of about 25 nm and a higher oxygen element concentration than other parts except the contact surface. Accordingly, it is estimated that by storing the solid-state battery in an oxygen-free atmosphere, at the predetermined temperature and for the predetermined time, the thickness of the high oxygen concentration layer can be controlled to the desired thickness. Also, it is thought that the sulfide-based solid electrolyte particles in the area around the contact surface with the oxide-based cathode active material particles, partially contain LixPOy (where 1≤x≤3 and 1≤y≤4).

From the above results, it is thought that on the contact surface of the sulfide-based solid electrolyte with the oxide-based cathode active material, which is a necessary part to reduce the heat generation amount of the solid-state battery, the high oxygen concentration layer having a higher oxygen element concentration than other parts except the contact surface, can be selectively formed by carrying out the charging step of the disclosed embodiments. Also, it is thought that the thickness of the high oxygen concentration layer can be controlled by carrying out the storing step of the disclosed embodiments. Also, it is thought that by carrying out these steps, the oxygen content of the sulfide-based solid electrolyte can be minimized, and the heat generation amount of the battery can be reduced with preventing an increase in the battery resistance.

REFERENCE SIGNS LIST

11. Solid electrolyte layer
12. Cathode layer
13. Anode layer
14. Cathode current collector
15. Anode current collector
16. Cathode
17. Anode
18. High oxygen concentration layer
21. Oxide-based cathode active material
22. Sulfide-based solid electrolyte
100. Solid-state battery
200. Solid-state battery
300. Solid-state battery

The invention claimed is:
1. A solid-state battery comprising:
a cathode comprising a cathode layer that contains an oxide-based cathode active material, an anode comprising an anode layer that contains an anode active material, and a solid electrolyte layer being disposed between the cathode layer and the anode layer and containing a solid electrolyte,
wherein at least any one of the cathode layer and the solid electrolyte layer contains a sulfide-based solid electrolyte, and
wherein, when TEM-EDX analysis is performed, the sulfide-based solid electrolyte comprises a high oxygen concentration layer on a contact surface with the oxide-based cathode active material, the high oxygen concentration layer having a higher oxygen element concentration than other parts except the contact surface.

2. The solid-state battery according to claim 1, wherein a thickness of the high oxygen concentration layer is from 1 nm to 100 nm.

3. A method for producing the solid-state battery defined by claim 1, the method comprising:
battery forming of forming a solid-state battery comprising: a cathode comprising a cathode layer that contains an oxide-based cathode active material, an anode comprising an anode layer that contains an anode active material, and a solid electrolyte layer being disposed between the cathode layer and the anode layer and containing a solid electrolyte,
charging the solid-state battery in an oxygen-free atmosphere until a potential of the cathode reaches 4.6 V or higher, and
storing the solid-state battery in an oxygen-free atmosphere after the charging,
wherein at least any one of the cathode layer and the solid electrolyte layer contains a sulfide-based solid electrolyte.

4. The method for producing the solid-state battery according to claim 3, wherein a storing temperature of the solid-state battery in the storing is from 60° C. to 80° C.

5. The solid-state battery according to claim 1, wherein the high oxygen concentration layer is formed only on the contact surface of the sulfide-based solid electrolyte with the oxide-based cathode active material.

6. The solid-state battery according to claim 2, wherein the thickness of the high oxygen concentration layer is from 25 nm to 50 nm.

7. The method for producing the solid-state battery according to claim 4, wherein a storing time of the solid-state battery in the storing step is from one hour to four hours.

8. The solid-state battery according to claim 1,
wherein the oxide-based cathode active material is a composite cathode active material having a coating layer on the surface of the oxide-based cathode active material, and
wherein the high oxygen concentration layer is formed on the contact surface of the sulfide-based solid electrolyte with the composite cathode active material.

* * * * *